(12) United States Patent
Kuhblank

(10) Patent No.: US 7,104,091 B2
(45) Date of Patent: Sep. 12, 2006

(54) BICYCLE LOCK

(75) Inventor: Martin Kuhblank, Berlin (DE)

(73) Assignee: Macro-Tec Development AG, Wollerau (CH)

( * ) Notice: Subject to any disclaimer, the term of this patent is extended or adjusted under 35 U.S.C. 154(b) by 0 days.

(21) Appl. No.: 10/530,698

(22) PCT Filed: Oct. 9, 2003

(86) PCT No.: PCT/DE03/03370

§ 371 (c)(1),
(2), (4) Date: Apr. 8, 2005

(87) PCT Pub. No.: WO2004/033279

PCT Pub. Date: Apr. 22, 2004

(65) Prior Publication Data

US 2006/0162407 A1    Jul. 27, 2006

(30) Foreign Application Priority Data

Oct. 9, 2002    (DE) ................................ 102 47 055

(51) Int. Cl.
*E05B 71/00* (2006.01)

(52) U.S. Cl. .................. 70/18; 70/49; 70/233; 70/261; 70/DIG. 49; 340/432; 362/253; 280/288.4

(58) Field of Classification Search .................. 70/233, 70/261, 58, DIG. 49, 18, 30, 49, 234–236; 280/288.4; 340/568.2, 568.3, 568.4, 432; 362/473, 253, 276, 802
See application file for complete search history.

(56) References Cited

U.S. PATENT DOCUMENTS

| | | | | |
|---|---|---|---|---|
| 3,755,778 A | * | 8/1973 | Kennedy et al. ............ | 340/427 |
| 3,781,861 A | * | 12/1973 | Adler et al. ................ | 340/571 |
| 3,824,540 A | * | 7/1974 | Smith, II .................... | 340/427 |
| 3,969,914 A | * | 7/1976 | Dennen ....................... | 70/234 |
| 3,990,279 A | * | 11/1976 | Brickel ....................... | 70/233 |
| 4,086,795 A | * | 5/1978 | Foster et al. ................. | 70/233 |
| 4,126,024 A | * | 11/1978 | Timmons et al. ............ | 70/233 |
| 4,155,067 A | * | 5/1979 | Gleeson ...................... | 340/429 |
| 4,187,497 A | * | 2/1980 | Howell et al. .............. | 340/429 |
| 4,546,345 A | * | 10/1985 | Naito ......................... | 340/542 |
| 4,656,564 A | * | 4/1987 | Felder ........................ | 362/474 |
| 4,776,188 A | * | 10/1988 | Dalaba et al. ............... | 70/49 |

(Continued)

FOREIGN PATENT DOCUMENTS

DE            4232540         *    3/1994

*Primary Examiner*—Lloyd A. Gall
(74) *Attorney, Agent, or Firm*—Gail C. Silver; Borden Ladner Gervais LLP

(57) ABSTRACT

A bicycle lock which can be fastened to a bicycle without any special holding device and which secures the bicycle, the seat support, and the seat is provided. The bicycle lock comprises a) a housing (2) and a drum (3) that is rotatably mounted within the housing (2), b) a cable (4) that is coiled onto the drum (3) and is directed towards the outside through an opening (6) of the housing (2). One end of the cable (4) is fixed to the drum (3) while the other end thereof, which is directed towards the outside, supports a half-lock (5a) that is connected to the half-lock (5b) disposed inside the housing (2) and can be fixed there, c) a coil spring (7) that is arranged between the housing (2) and through which the seat support (1) is guided, and e) a fastening element for fixing the housing (2) to the seat support (10).

8 Claims, 4 Drawing Sheets

U.S. PATENT DOCUMENTS

| | | | | |
|---|---|---|---|---|
| 4,970,882 A | * | 11/1990 | Arrendondo | 70/30 |
| 5,023,596 A | * | 6/1991 | Sirman et al. | 340/571 |
| 5,251,464 A | * | 10/1993 | Halter | 70/30 |
| 5,408,212 A | * | 4/1995 | Meyers et al. | 340/427 |
| 5,412,963 A | * | 5/1995 | Carlo et al. | 70/209 |
| 5,563,579 A | * | 10/1996 | Carter | 340/539.17 |
| 5,598,727 A | * | 2/1997 | White | 70/233 |
| 5,653,365 A | * | 8/1997 | Lee | 224/448 |
| 5,786,759 A | * | 7/1998 | Ling | 340/542 |
| 6,373,382 B1 | * | 4/2002 | Tikkanen et al. | 340/432 |
| 6,997,584 B1 | * | 2/2006 | Rothan et al. | 362/473 |

* cited by examiner

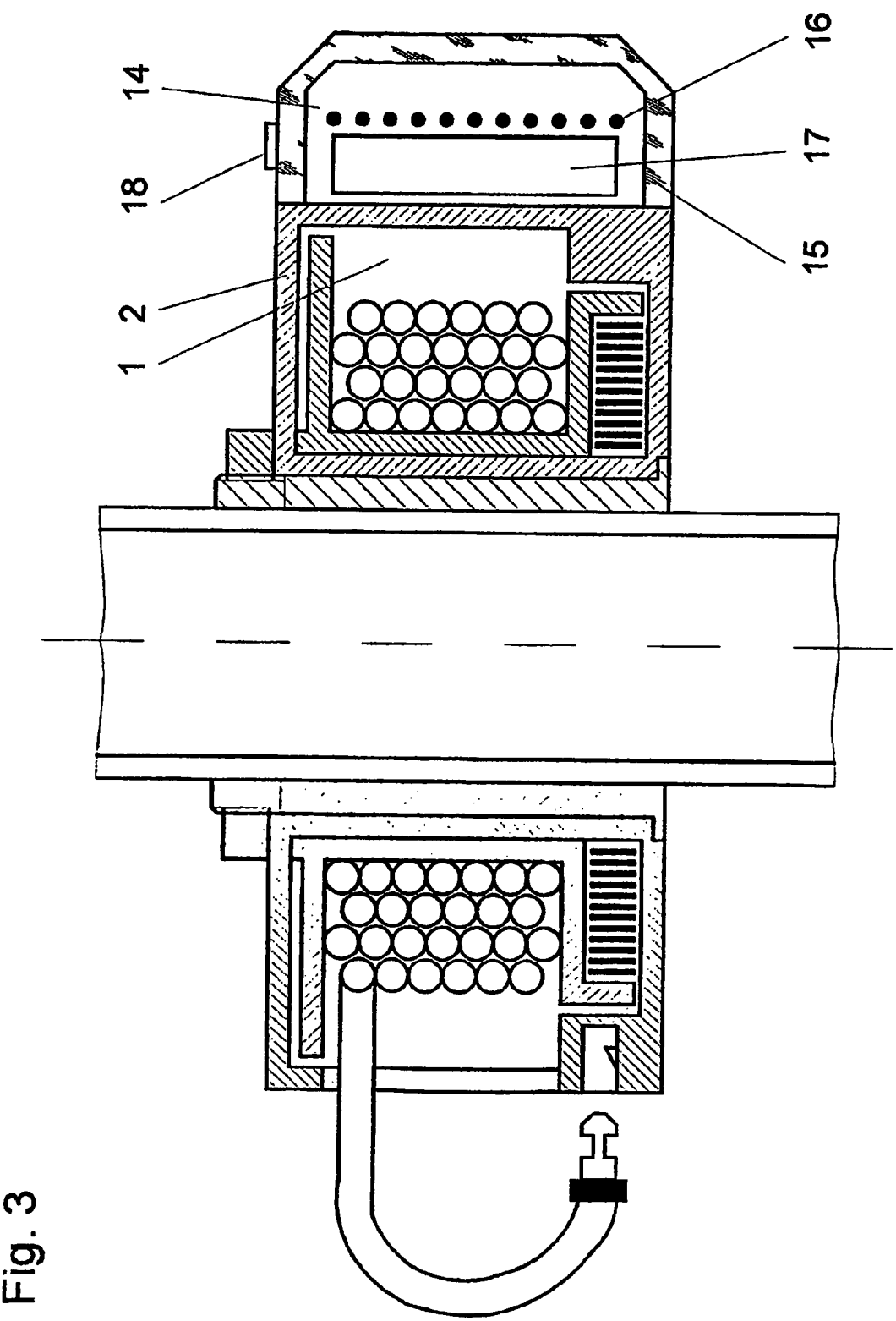

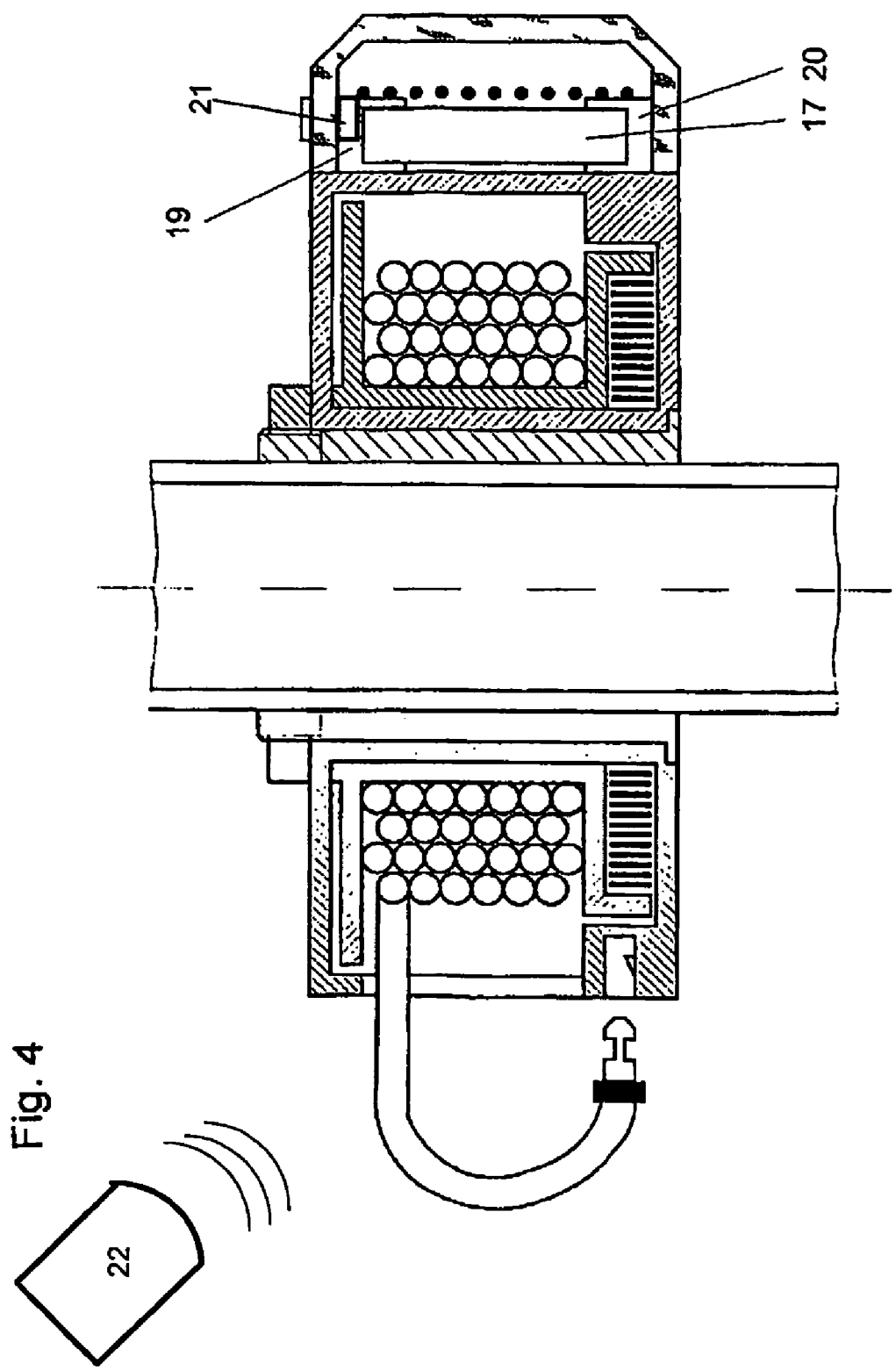

BICYCLE LOCK

FIELD OF THE INVENTION

The invention relates to a lock for bicycles.

BACKGROUND OF THE INVENTION

Bicycles are secured against theft with the aid of special locks. However, absolute security cannot be obtained; even the most stable and complicated locks can be opened by unauthorized persons with appropriate efforts. However, most locks offer good protection against spontaneous theft.

In the German Laid-Open Specification DE 42 32 540 A1, a lock for two-wheeled vehicles (with the wheels one behind the other) is described. The lock consists of a tubular container in which a centrally supported drum is arranged and around which a rope is wound. One end of the rope is fastened to the drum so as to be undetachable. The other end of the rope supports a safety lock half. To lock it, the safety lock half can be inserted into a second safety lock half fastened to the top end of the container so as to be undetachable.

The disadvantage of this bicycle lock and all other known bicycle locks is that it is fastened—if at all—to the bicycle with a special holding device and that the seat support and the seat connected with it are not included in the protection.

SUMMARY OF THE INVENTION

The object of the invention is to provide a bicycle lock which can be fastened to the bicycle without a special holding device and with which both the bicycle and the seat support and the seat connected thereto are secured.

This object is solved with an invention having the features of the main claim. Advantageous embodiments can be found in the subclaims.

DETAILED DESCRIPTION

The invention will be described in the following with reference to an embodiment, in which FIG. 1 shows a longitudinal section through the bicycle lock according to the invention.

FIG. 3 shows a bicycle lock according to the invention combined with a rear light.

FIG. 4 shows a bicycle lock according to the invention combined with an acoustic signalling device and a transmitter.

Figure 1:
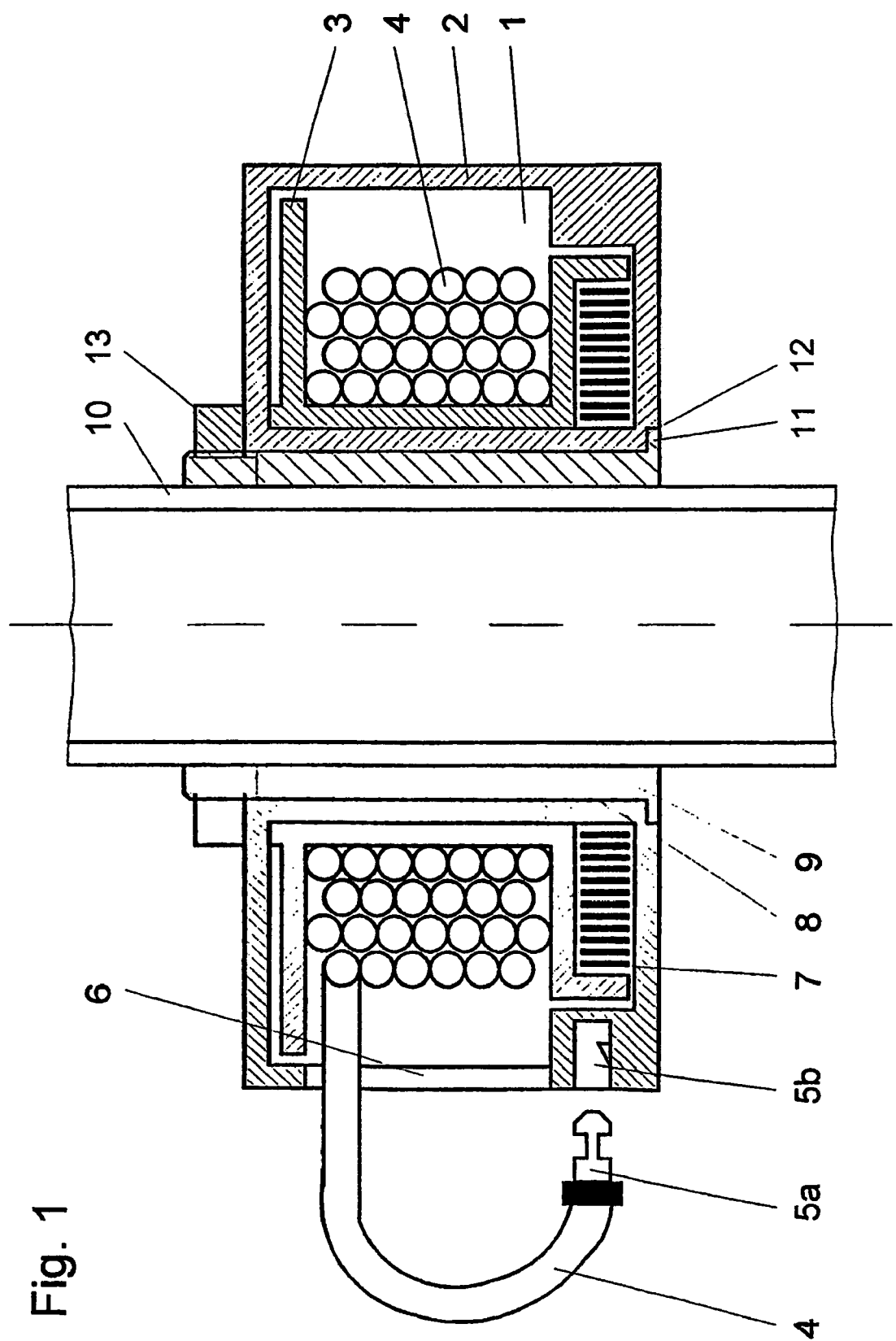

FIG. 1 shows a bicycle lock 1 according to the invention which consists of a housing 2 and a drum 3 that is rotatably mounted in the housing 2, a cable 4 which is completely wound around said drum 3. The housing 2 has an opening 6 through which the cable 4 is guided outward. The cable 4 is fastened to the drum 3 with one end and supports a half-lock 5a on the other end, directed toward the outside. Said half-lock 5a can be connected with the half-lock 5b situated in the housing 2 and can be fixed there by means of a safety lock (not shown).

The safety lock 5 is preferably configured as a combination lock which is opened via a combination to be set. However, the lock 5 can also be locked and unlocked e.g. via a radio signal.

A coil spring 7 is arranged between the housing 2 and the drum 3, said coil spring 7 becoming tight when the drum 3 is turned and the cable 4 is being pulled out. When the load is gone, the coil spring 7 turns the drum 3 back until the cable 4 is wound up or tightened.

The housing 2 has a centrally situated cylindrical opening 8 in which a tube 9 is arranged. The outside diameter of the tube 9 corresponds to the diameter of the opening 8 and the inside diameter of the tube 9 corresponds to the diameter of the seat support 10.

The tube 9 is connected with the housing 2 so as to be resistant to torsion. This can take place as follows: on one end, the tube has at least one nose 11 arranged on the periphery, said nose 11 engaging in a recess 12 of the housing 2 which corresponds to the shape of the nose.

The tube 9 is fixed on the seat support 10 to ensure a defined position of the bicycle lock 1. In this embodiment, the tube 9 is fixed by a nut 13 which presses the end slit over the length of the thread (not shown) of the tube 9 against the seat support 10 and in this way produces a force-fit connection between seat support 10 and tube 9. At the same time, the nut 13 presses the housing 2 against the noses 11 of the tube 9.

Figure 2:
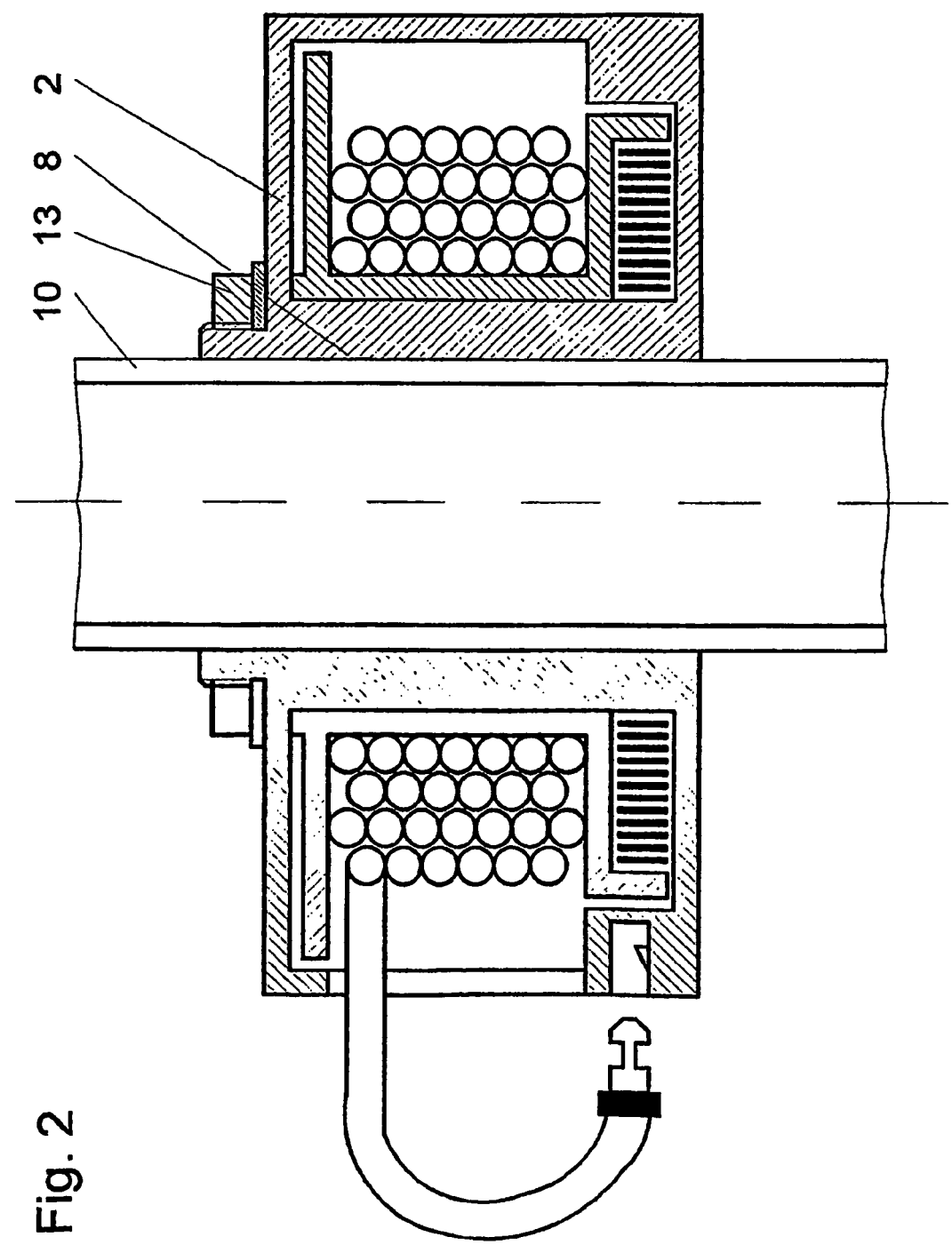
FIG. 2 shows a variation of the bicycle lock according to FIG. 1.

As shown in FIG. 2, the tube 9 can be omitted and be designed as part of the housing 2. In this way, only a fastening element corresponding to the thread and the nut 13 must be provided; this ensures the firm connection between the housing 2 and the seat support 10. The connection between the housing 2 and/or the tube 9 and the seat support 10 is not restricted to the form shown, but can be accomplished by means of other known connecting elements. However, the use of tubes 9 has the advantage that, by using tubes 9 having different inside diameters or inside cross sections, the bicycle lock 1 according to the invention can be adapted to seat supports 10 of various diameters or cross-sectional shapes.

According to a further embodiment, the bicycle lock 1 according to the invention is combined with a rear light 14. The position of the bicycle lock 1 on the seat support 10 and its particular position offer optimal prerequisites for the positioning for a rear light on the bicycle lock 1. FIG. 3 shows the connection of the bicycle lock 1 of FIG. 1 with a rear light 14. The rear light 14 consists of a transparent cover 15 which is connected with the housing 2. Light diodes 16 which are supplied with power by a battery 17 are arranged below the cover 15. The electrical connection is made or interrupted by a switch 18.

According to a further embodiment (FIG. 4), the bicycle lock 1 according to the invention is combined with an acoustic signaling device 19 which is activated when the cable 4 is cut. The signaling device is supplied with power by the battery 17 and is set in such a way that the acoustic signal sounds for about 30 seconds at such a volume that the signal is audible for up to a distance of 300 m. In addition, the acoustic signaling device 19 can be connected with a motion sensor 21 which releases an alarm when the bicycle is subjected to a certain number of movements within a specific time.

A further embodiment of the bicycle lock according to the invention provides that the acoustic signalling device 19 is provided with a transmitter 20 which, as soon as the signalling device is actuated, transmits a corresponding message to the mobile telephone of the owner and/or which sends a radio signal that makes it possible to locate the bicycle lock (and with it the bicycle) via locator systems, such as GPS.

The rear light 14 is electrically connected to the safety lock 5 in such a way that it can only be activated when the safety lock is not closed. This prevents the battery 17 from being discharged with the goal of preventing the release of an alarm.

The bicycle lock according to the invention can be designed in such a way that its operation (the locking and unlocking of the lock 5; switching the rear light on; stopping the alarm, etc.) takes place via a radio remote control 22. The remote control itself can be secured by a PIN. The advantage of this is that only the owner of the remote control 22 is able to operate the bicycle lock 1.

LIST OF REFERENCE NUMBERS

1 Bicycle lock
2 Housing
3 Drum
4 cable
5 Lock
6 Opening
7 Coil spring
8 Opening
9 Tube
10 Seat support
11 Nose
12 Recess
13 Nut
14 Rear light
15 Cover
16 Light diodes
17 Battery
18 Switch
19 Signaling device
20 Transmitter
21 Motion Sensor
22 Radio Remote Control

The invention claimed is:

1. A bicycle lock comprising
   a) a housing having a centrally positioned cylindrical opening sized to allow passage of a seat support and a drum rotatably mounted in the housing,
   b) a cable wound on the drum which is guided outward through an opening of the housing, whereby the cable is fastened to the drum with one end, and on the other outwardly guided end supports a half-lock which can be connected with the half-lock arranged in the housing and fixed there,
   c) a coil spring which is arranged between the housing and the drum,
   d) a fastening element for fixing the housing to the seat support
   e) a rear light connected to the exterior of the housing, and
   f) an acoustic signaling device connected to a battery and the cable, for producing an acoustic signal upon detection of a break in the cable, the battery also providing power to the rear light.

2. The bicycle lock according to claim 1, characterized in that the fastening element for fixing the housing to the seat support is formed by a tube which is arranged in the opening of the housing so as to be resistant to torsion, whose outside diameter corresponds to the diameter of the opening and whose inside diameter corresponds to the diameter of the seat support and which is adapted to be fixed to the seat support.

3. The bicycle lock according to claim 2, characterized in that at least one of the tube and housing is adapted to be fixed to the seat support by means of a nut.

4. The bicycle lock according to claim 2, further including a tube having an exterior diameter sized to fit inside the cylindrical opening in the housing and having different inside diameters or cross-sectional shapes, corresponding to different seat supports.

5. The bicycle lock according to claim 1, characterized in that the acoustic signaling device is connected with a motion sensor for producing an acoustic signal upon receipt of a signal from the motion sensor indicative of motion.

6. The bicycle lock according to claim 1, characterized in that the acoustic signaling device is connected to a transmitter which is adapted to transmit a message via an alarm to a mobile telephone of the owner and/or transmits a radio signal which makes it possible to locate the bicycle lock via locator systems.

7. The bicycle lock according to claim 1, characterized in that the bicycle lock is adapted to be operated via a remote control.

8. The bicycle lock according to claim 1, wherein the engagement of the cable end with the half-lock in the housing prevents activation of the rear light.

* * * * *

UNITED STATES PATENT AND TRADEMARK OFFICE
CERTIFICATE OF CORRECTION

PATENT NO. : 7,104,091 B2 Page 1 of 1
APPLICATION NO. : 10/530698
DATED : September 12, 2006
INVENTOR(S) : Martin Kuhblank It is certified that error appears in the above-identified patent and that said Letters Patent is hereby corrected as shown below:

Column 3, line 37, claim 1, insert a colon --:-- after the word "comprising";

Column 4, line 4, claim 1(d), insert a comma --,-- after the word "support"; and Column 4, line 22, claim 4, delete "a tube" and insert therefor --a plurality of tubes--.

Signed and Sealed this

Second Day of January, 2007

JON W. DUDAS
*Director of the United States Patent and Trademark Office*